J. F. JOSEPH.

HOSE CONSTRUCTION.

APPLICATION FILED NOV. 2, 1915.

Reissued Jan. 11, 1916.

14,046.

Inventor

John F. Joseph

By Robert M. Pierson

Attorney

UNITED STATES PATENT OFFICE.

JOHN F. JOSEPH, OF AKRON, OHIO, ASSIGNOR, BY MESNE ASSIGNMENTS, TO THE B. F. GOODRICH COMPANY, A CORPORATION OF NEW YORK.

HOSE CONSTRUCTION.

14,046. Specification of Reissued Letters Patent. Reissued Jan. 11, 1916.

Original No. 1,100,829, dated June 23, 1914, Serial No. 619,555. Application for reissue filed November 2, 1915. Serial No. 59,325.

*To all whom it may concern:*

Be it known that I, JOHN F. JOSEPH, a citizen of the United States, residing at Akron, in the county of Summit and State of Ohio, have invented certain new and useful Improvements in Hose Construction, of which the following is a specification.

Figure 1:
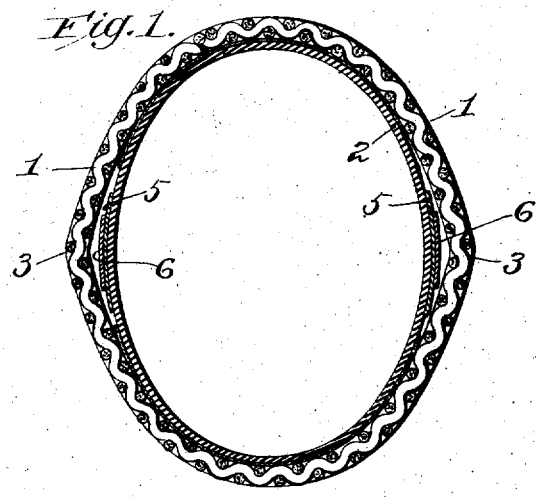
Figure 2:
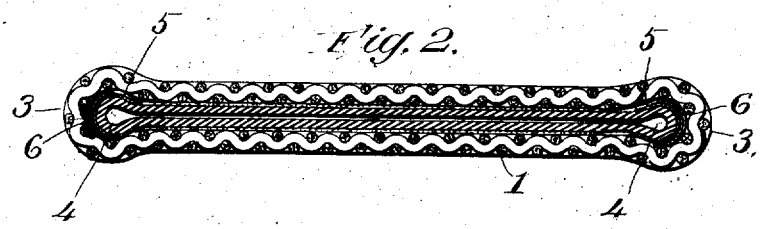
Figure 3:
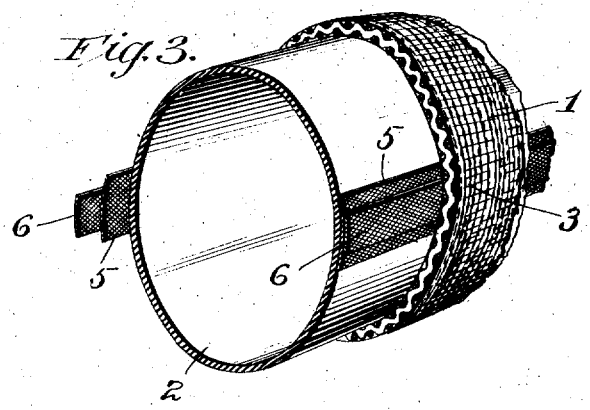

My present invention pertains to hose construction, the formation and advantages of which will be hereinafter set forth, reference being had to the annexed drawings, wherein:

Figure 1 is a transverse sectional view of a hose constructed in accordance with my invention, the hose being shown in its inflated or distended condition; Fig. 2 a similar view, showing the hose flattened; and Fig. 3 a perspective view of a section of the hose.

The present invention is an improvement in jacketed hose adapted to be flattened and creased at the sides when empty and having a rubber liner loose at the creases, and, as herein specifically shown, it forms an improvement upon the subject-matter of Letters Patent No. 935,086, granted to C. M. C. Baird under date of September 28, 1909. The construction as set forth and claimed in said patent consists essentially of a flexible casing and an inner tubular lining, said lining being attached to the inner wall of the casing except at two oppositely-disposed points, where, by reason of the fact that it is not connected, the hose will crease or bend when assuming its flattened condition, the loose sections of the inner tube curving or rounding at the crease in the hose without puckering or pinching. The life of rubber-lined hose depends upon the life of that part of the lining which lies adjacent to the creases of the casing, and the main object of the present invention is to produce a structure of the specific type shown in said patent or more generally of any type of jacketed hose whose liner is loose at the creases, having means for prolonging the life of the tube at such points. To this end, I reinforce the tube at such points by the application of a fabric band, preferably produced from a plurality of cloth strips, cut on the bias.

In the drawings, 1 denotes the outer casing, produced in any approved manner, and 2 the inner rubber tube, the casing being primarily creased upon opposite sides, as at 3, to cause it to bend at such points when it flattens, as it will naturally do when not in use. The inner tube 2 is free from the casing along the creases 3, and for a considerable distance each side of each crease, and the remaining portions are firmly cemented to the casing 1. This formation permits or causes the parts to assume the position and condition indicated in Fig. 2, the free portions of the lining tube 2 rounding without creasing, as at 4. To prolong the life of the tube at such points, I cement to the outer face thereof, at each side where the crease in the hose takes place, a reinforcing band, preferably composed of a plurality of strips of cloth cut on the bias, the innermost strip 5 being somewhat wider than the outermost strip 6. It is conceivable that the band might be produced by the use of a single strip, or that a number of plies, greater than two, may be used. These bands not only act to reinforce the tubing at the points where they are attached, but likewise tend to stiffen it somewhat at the creases, thereby tending to make the tube bend more nearly on the lines of a circle, doing away with the possibility of any pinching or puckering of the inner face of the tube at such points. Bias fabric is preferably employed, as it permits the band to elongate and thus accommodate itself to the extension of the hose, which takes place to a greater or less extent when the hose is in use.

Having thus described my invention, what I claim is:

1. A hose, comprising a flexible, tubular casing creased along opposite sides to assume a flattened form when empty; a tubular lining of rubber free from the casing along and adjacent to the creases; and an extensible band formed of bias fabric secured upon the outer face of the tubular lining and extending lengthwise thereof along such free portions and lying next to the casing.

2. A hose, comprising a flexible, tubular casing creased along opposite sides to assume a flattened form when empty; a tubular lining of rubber cemented to the casing between the creases, but free from the casing along and adjacent to the creases; and an extensible band formed of bias fabric secured upon the outer face of the tubular lining and extending lengthwise thereof along such free portions and lying next to the casing.

3. A hose, comprising a flexible, tubular casing creased along opposite sides to assume a flattened form when empty; a tubular lining of rubber cemented to the casing between the creases, but free from the casing along and adjacent to the creases; and an extensible band formed of a plurality of superposed strips of bias fabric cemented to the outer face of the tubular lining and extending lengthwise thereof along such free portions and lying next to the casing.

In testimony whereof, I have hereunto set my hand this 30th day of October 1915.

JOHN F. JOSEPH.